United States Patent [19]

Okamoto et al.

[11] Patent Number: 4,462,152

[45] Date of Patent: Jul. 31, 1984

[54] METHOD OF MOUNTING COILS ON THE ROTOR OF A SUPERCONDUCTIVE ROTARY ELECTRIC MACHINE

[75] Inventors: Kouichi Okamoto; Norio Oishi, both of Kobe; Masaki Sakuyama, Ashiya; Tatsuei Nomura, Itami; Tadatoshi Yamada, Kobe; Masatami Iwamoto, Itami, all of Japan

[73] Assignee: Mitsubishi Denki Kabushiki Kaisha, Tokyo, Japan

[21] Appl. No.: 363,774

[22] Filed: Mar. 31, 1982

[30] Foreign Application Priority Data

Apr. 2, 1981 [JP] Japan .................................. 56-50883

[51] Int. Cl.³ ............................................. H02K 15/09
[52] U.S. Cl. ........................................ 29/598; 29/605;
310/10; 310/52; 310/270
[58] Field of Search ..................... 29/598, 605; 310/52,
310/54, 10, 40, 42, 270

[56] References Cited

U.S. PATENT DOCUMENTS

| | | | |
|---|---|---|---|
| 4,095,333 | 6/1978 | Kuter et al. | 29/598 |
| 4,131,988 | 1/1979 | Finegold | 29/596 |
| 4,152,609 | 5/1979 | Cooper et al. | 310/52 |
| 4,217,515 | 8/1980 | Long et al. | 310/270 |
| 4,275,324 | 6/1981 | Flick | 310/270 |
| 4,385,248 | 5/1983 | Laskaris | 310/52 |

Primary Examiner—Carl E. Hall
Attorney, Agent, or Firm—Wenderoth, Lind & Ponack

[57] ABSTRACT

A method of winding and mounting superconductive coils on a cylindrical surface of the coil-carrying shaft of a rotor of a rotary electric machine. A superconductive wire is wound around the circumferential surface of a rectangular bobbin, thereby forming coils. The four straight portions of the circumferential surface are connected with each other by circularly curved surface portions. The portions of the circumferential surfaces corresponding to the axial direction of the coil-carrying shaft have a plurality of steps formed in the direction perpendicular to the axial direction of the coil-carrying shaft. A detachable side plate on the bobbin is then taken off, and the coil is removed from the bobbin. The coils thus formed are mounted on the surface of the coil-carrying shaft, in which a plurality of axially running grooves and a pair of annular recesses running in the circumferential direction of the coil-carrying shaft and connecting the ends of the grooves, the grooves and recesses being pre-formed corresponding to the coils for receiving them therein. A pair of sleeves are fitted over the recesses, thereby securely holding the end portions of the coils in the recesses.

3 Claims, 7 Drawing Figures

FIG. 4
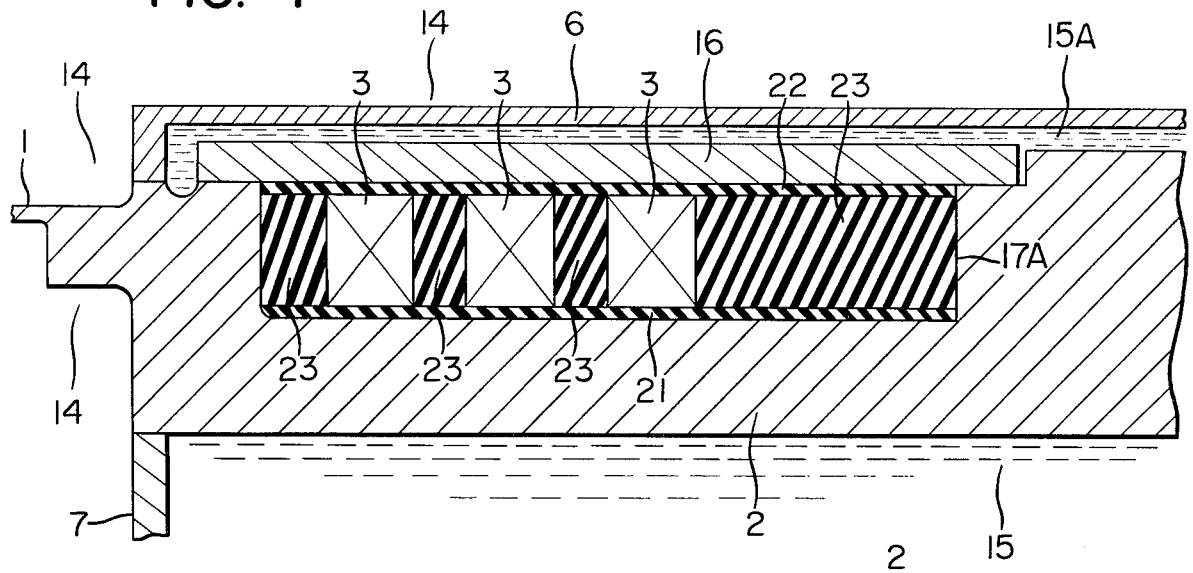
FIG. 5
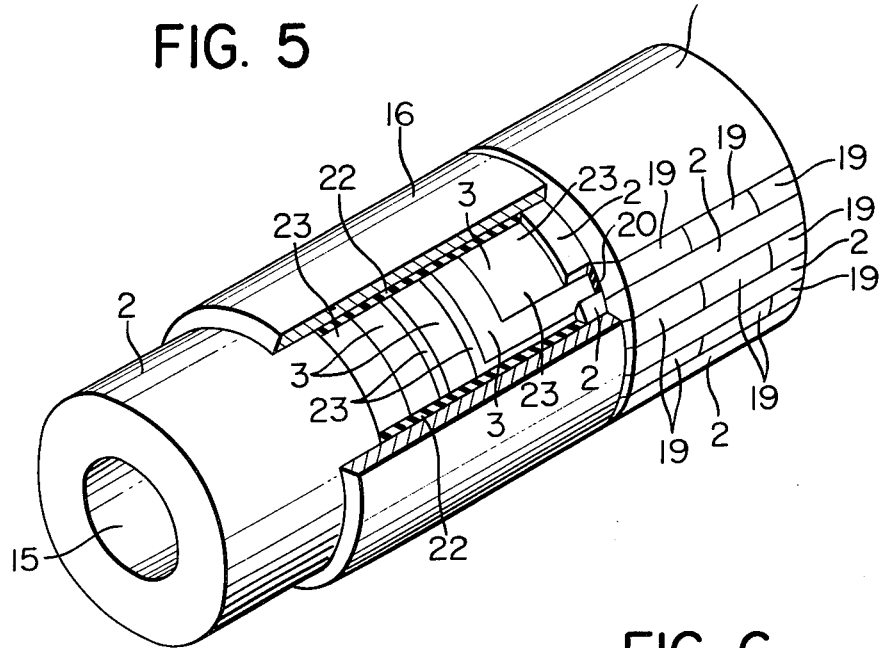
FIG. 6
FIG. 7
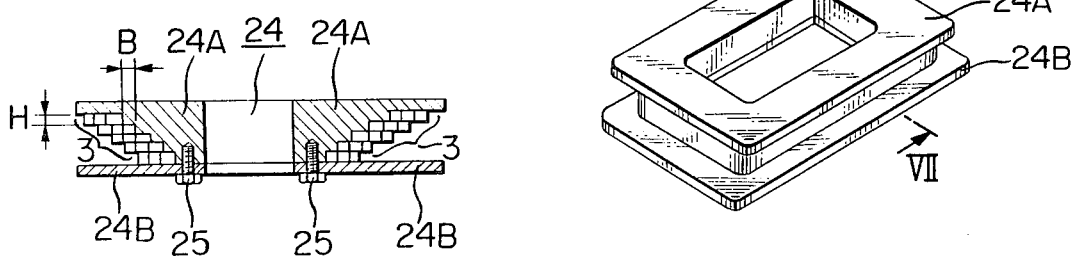

METHOD OF MOUNTING COILS ON THE ROTOR OF A SUPERCONDUCTIVE ROTARY ELECTRIC MACHINE

BACKGROUND OF THE INVENTION

1. Field of the Invention

This invention relates to methods of mounting coils on rotors of rotary electric machines, and more particularly to methods of winding and mounting superconductive coils on rotors of superconductive rotary electric machines.

2. Description of the Prior Art

The electrical resistance of certain metals, such as lead, vanadium, and tin, and alloys, such as niobium-tin, becomes vanishingly small, i.e., they become superconductive, when the temperature falls below the transition temperatures thereof which are in the neighbourhood of a few degrees above absolute zero. Thus, if the field coils of an alternating current generator, for example, are formed of a superconductive material and are cooled below the transition temperature thereof, large magnetic fields can be established without the expenditure of appreciable amounts of electrical energy. When the field coils are mounted on the rotor of an alternating current generator, however, it is of paramount importance to securely mount the coils on the rotor, for the displacement of the superconductive field coils due to the movement of the rotor may generate frictional heat which destroys the superconductivity of the field coils. The fact that the superconductive field coils should be covered many times for the purpose of preventing outside heat from entering thereinto makes the reliable and secure mounting of the field coils all the more important, for such complicated structures covering the field coils make the checking and repairing of the field coils difficult to carry out.

Thus, it has been proposed to mount the superconductive field coils in corresponding grooves formed on the surface of the cylindrical coil-carrying shaft, and to securely hold the field coils in the grooves with a plurality of wedges fitted into the grooves above the field coils. The portions of the grooves running in the circumferential direction of the coil-carrying cylinder, however, have the form of partial annuli, and the wedges covering those portions of the grooves are curved, so that their machining requires much time and labour, and such precision machining is hard to attain. Further, the coils have conventionally been directly wound along the surface of the coil-carrying cylinder, bending each turn of the winding of the coil along the coil-carrying shaft. The field coils, however, have as many as several thousand turns in each winding thereof, and the superconductive linear wires from which the field coils are formed can not endure extreme bending deformation. Thus, the winding of the coils on the coil-carrying cylinder requires much labour and time, and imposes a psychological burden on the workers involved.

SUMMARY OF THE INVENTION

Therefore an object of the invention is an improved method of winding and mounting coils formed of linear superconductive wire on a cylindrically curved surface of the coil-carrying shaft of the rotor of a superconductive rotary electric machine. The present invention contemplates providing a method by which the coils can be wound and mounted with less labour and time, yet can be securely and reliably mounted on the coil-carrying shaft of the rotor of a superconductive rotary electric machine.

According to the present invention, a plurality of grooves are formed on the outer surface of the cylindrical coil-carrying shaft in the axial direction thereof, and a pair of annular indentations running in the circumferential direction of the coil-carrying shaft and connecting the grooves are formed on the same surface of the coil-carrying shaft. Then, a linear superconductive wire is wound around a groove formed on the circumferential surface of a bobbin having the form of a planar rectangular ring, and is formed into superconductive coils substantially having the form of rectangular loops. The four straight portions of the bottom surface of the groove of the bobbin are connected with each other by circularly curved surface portions, such that the wire is not bent beyond the maximum degree of bending that the wire can endure. Preferably, the portions of the bottom surface of the groove corresponding to the axial direction of the coil-carrying shaft have a plurality of steps formed thereon in the direction transversal to the axial direction. The coils are then removed from the bobbin, and secured in the grooves and the indentations formed on the outer surface of the coil-carrying shaft. Preferably, electrically insulating layers are disposed on the surfaces of the grooves and the bottom surfaces of the indentations, before the coils are disposed therein. Further, it is preferred that electrically insulating fillers are fitted into the spaces left by the coils in the indentations, and then the outer surfaces of the field coils and the fillers are covered by electrically insulating covers. Then, wedges are fitted above axially running portions of the coils and the insulator covers in the grooves, and a pair of sleeves are fitted around the pair of indentations over the circumferentially running portions of the coils and the insulator covers.

BRIEF DESCRIPTION OF THE DRAWINGS

Further objects and advantages of the present invention will become more apparent from the following detailed description of the preferred embodiments taken in conjunction with the accompanying drawings, in which:

FIG. 4 is a partial cross-sectional view of an end portion of the coil-carrying shaft of a rotor forming part of a superconductive rotary electric machine, showing a modified method of mounting the circumferentially running portions of the field coils;

FIG. 5 is a partially broken-away perspective view of an end portion of the coil-carrying shaft of FIG. 4;

FIG. 6 is a perspective view of a bobbin for winding a superconductive wire into field coils according to the present invention;

FIG. 7 is a cross-sectional view of the bobbin of FIG. 6, taken along the line VII—VII of FIG. 6.

In the drawings, like reference numerals and characters represent like or corresponding parts.

DETAILED DESCRIPTION OF THE PREFERRED EMBODIMENTS

Figure 1:
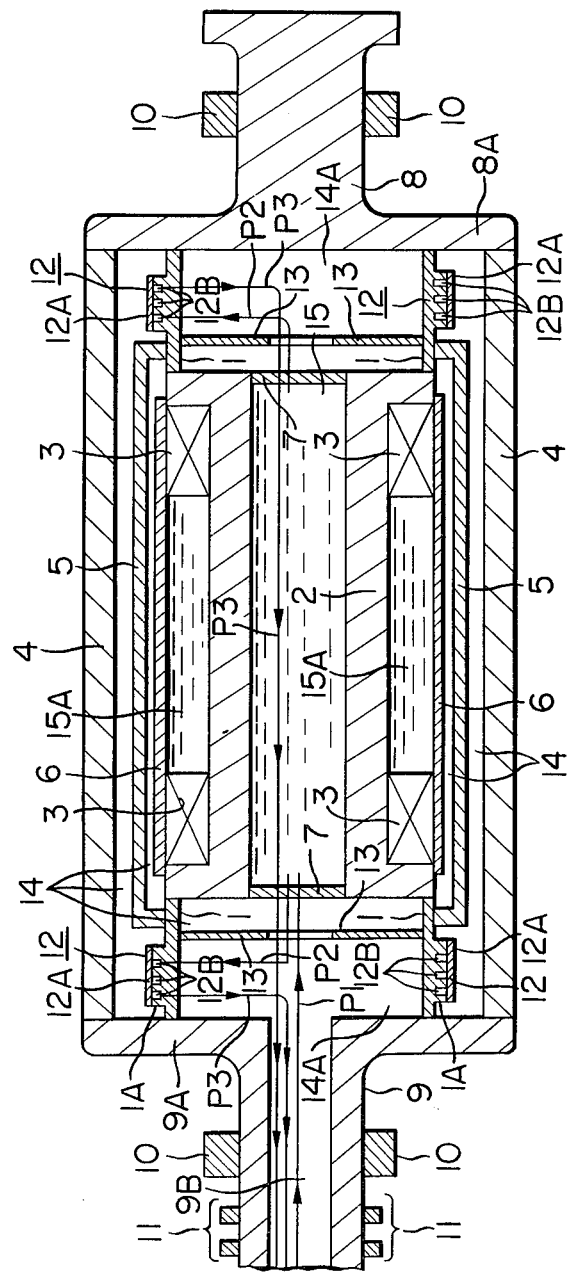
FIG. 1 is an axial cross-sectional view of a conventional rotor carrying superconductive field coils of an alternating current generator.

FIG. 1 shows a conventional rotor structure of an alternating current generator having superconductive field windings. The outer housing of the rotor is formed by a normal temperature damper 4, a disk-shaped member 8A on a driving shaft 8, outwardly turning annular flange portion 9A on a non-driving shaft 9 having a central bore 9B therein, the driving and the non-driving end shafts 8 and 9 being rotatably supported in bearings 10. A coil-carrying shaft 2 having the form of a thick hollow cylinder is disposed coaxially within the normal temperature damper 4, the outwardly turning flange portions of the shaft 2 at the two ends thereof being fixedly secured to a pair of torque tubes 1 having the form of thin hollow cylinders, and which in turn are fixedly mounted on the disk-shaped member 8A and the annular flange portion 9A of the driving and the non-driving end shafts 8 and 9. Field coils 3 formed of a superconductive material are mounted on the outer surface of the coil-carrying shaft 2. Each field coil 3 has substantially the form of a rectangular loop which has two straight sides running in the axial direction of the coil-carrying shaft 2, and two circularly curved portions running in the circumferential direction thereof, the cross-sections of the curved portions of field coil 3 being schematically shown in FIG. 1. A pair of slip rings 11 is fitted around the non-driving end shaft 9 for the purpose of receiving field current supplied to the field coils 3.

A central liquid helium container 15 is defined by the inner surface of the coil-carrying shaft 2 and a pair of end plates 7 having the form of disks, liquid phase helium being supplied thereto through the helium supply pipe schematically shown at P1 extending through the central bore 9B of the non-driving end shaft 9. A peripheral liquid helium container 15A is defined by the outer surface of the coil-carrying shaft 2 and a cylindrical outer wall 6, liquid helium being supplied thereto through communication ports (not shown) extending through the coil-carrying shaft 2 in the radial direction thereof. Thus, the field coils are immersed in the liquid helium contained in the peripheral helium container 15A and are cooled below the transition temperature thereof. A low temperature damper 5 having the form of a hollow cylinder is disposed between the outer wall 6 of the peripheral helium container 15A and the normal temperature damper 4, and is fixedly mounted on the outer surface of the torque tubes 1. The cylindrical spaces between the normal temperature damper and the low temperature damper 5, and between the low temperature damper 5 and the outer wall 6 of the peripheral helium container 15A, are kept at a vacuum, thereby preventing heat from outside from entering the low temperature portion adjacent to the helium containers 15 and 15A. The spaces 14 within the torque tubes 1 are also kept at a vacuum, and radiation shields 13 having the form of annular plates are fixedly mounted on the inner surface of the torque tubes 1 for the purpose of preventing radiation heat from entering into the low temperature portions. Each torque tube 1 has formed on the outer surface thereof an annular outwardly projecting ring portion 1A in which a heat exchanger is formed which comprises a helical groove defined on the circumferential surface of the ring portion 1A, and a lid 12A having the form of a hollow cylinder which covers the groove 12B. The helium contained in the central container 15 is supplied to one end of each groove 12B through the pipe schematically shown at P2, and exhausted from the other end of each groove 12B through the pipe schematically shown at P3 which leads the helium out through the central bore 9B of the non-driving end shaft 9. Thus, the torque tubes 1 which have a small thickness are cooled by the heat exchanger 12, and the conduction heat entering the low temperature portion through the torque tubes 1 is minimized.

In the case of the rotor of FIG. 1, the field coil 3 disposed on the coil-carrying shaft 2 is cooled to a low temperature below the transition temperature near absolute zero, whereby the electrical resistance of the field coil 3 is reduced to a vanishingly small value which is practically negligible. Thus the loss of electrical energy in generating the magnetic field also becomes negligible. Therefore, a large magnetic field is generated by the superconductive field coil 3, and alternating current is generated in the stator windings (not shown).

The normal and low temperature dampers 4 and 5 shield the high frequency magnetic fields generated in the stator (not shown) and protect the superconductive field coils 3 therefrom. The dampers 4 and 5 have further functions of attenuating the vibration of the rotor caused by the perturbations of the electrical system of which the superconductive rotary electric machine forms a part. The normal temperature damper 4 also functions as the outer cylinder of the vacuum portion 14, and the low temperature damper 5 functions as the radiation shield which prevents radiation heat from entering the helium containers 15 and 15A. The details of the piping within the rotor for supplying liquid helium to the container 15 and for exhausting helium therefrom, and of the means for supplying and exhausting helium to and from the rotor, are omitted, because they are well known in the art.

The superconductive field coil 3 should be securely and fixedly mounted on the coil-carrying shaft 2, for, if moved and displaced with respect to the coil-carrying shaft 2 during operation, the field coil 3 may be heated above the transition temperature thereof due to the frictional heat generated by such movements and thus may lose its super-conductivity. Further, because the field coils 3 are covered threefold by the helium container outer wall 6, and the normal and low temperature dampers 4 and 5, the checking and the repair thereof are very difficult to perform. In the case of superconductive rotary electric machines in particular, for which high reliability is required, the mounting method of the superconductive field coils is of paramount importance.

Figure 2:
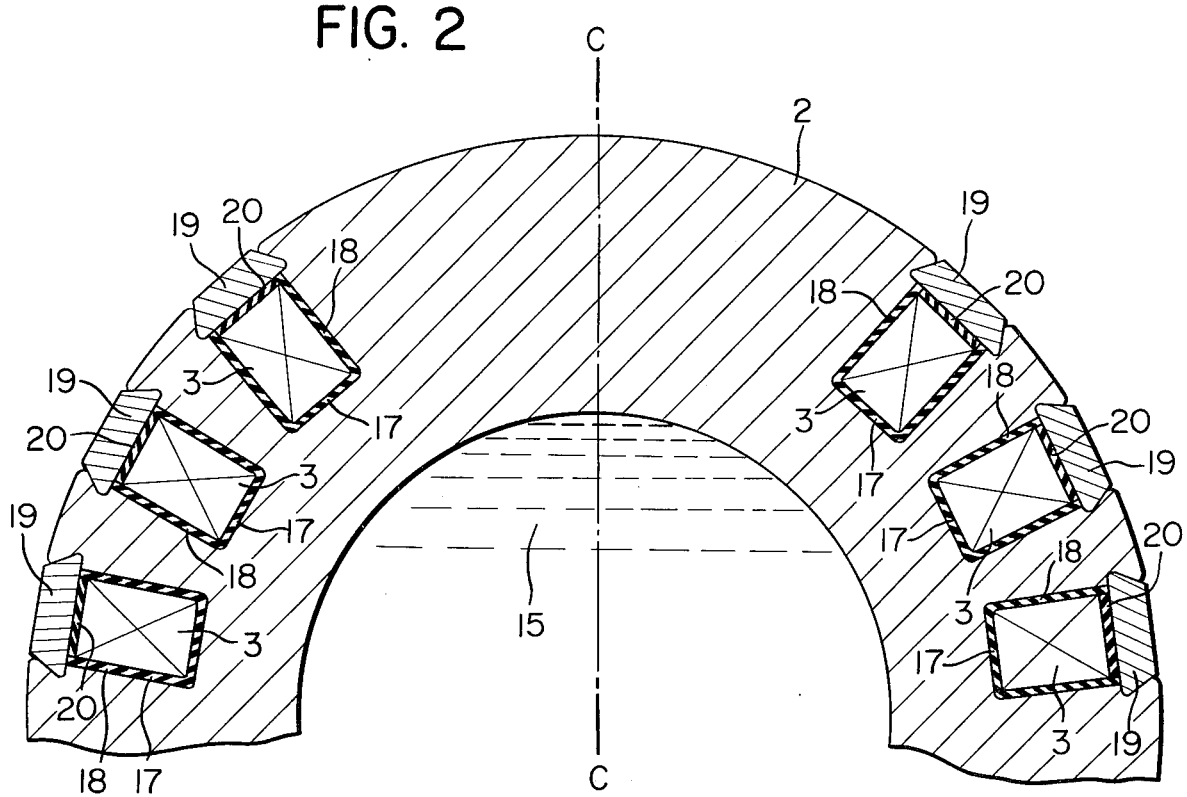
FIG. 2 is a cross-sectional end view of a part of a coil-carrying shaft of a rotor forming part of a superconductive rotary electric machine, showing the plurality of grooves running in the axial direction of the coil-carrying shaft.
Figure 3:
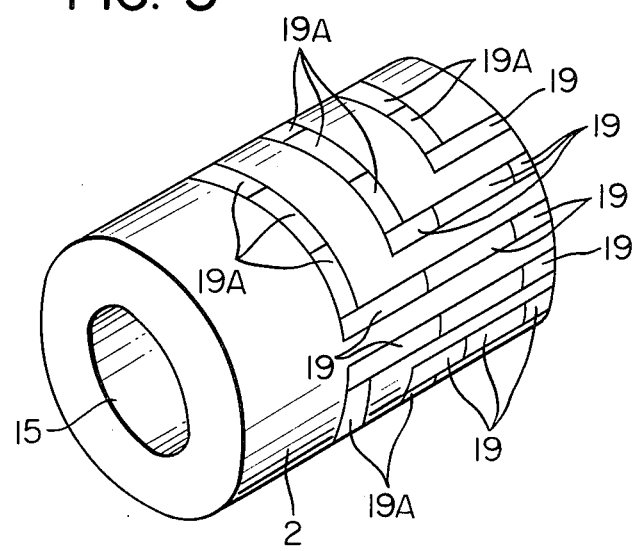
FIG. 3 is a perspective view of a part of the coil-carrying shaft of FIG. 2.

Referring now to FIGS. 2 and 3 of the drawings, another rotor structure of a superconductive rotary electric machine is described, in which the field coils are mounted on the rotor more securely than in the case of the rotor of FIG. 1.

FIG. 2 shows a cross-sectional end view of the coil-carrying shaft 2 of a rotor of an alternating current generator, in which the superconductive field coil 3 are fixedly secured in grooves 17 defined in the outer surface of the coil-carrying shaft 2. The field coils 3 are fitted into the grooves 17 the inside surfaces of which are covered by electrically insulator layers 18, the outer surfaces of the field coils 3 being covered by electrically insulating covers 20. A plurality of wedges 19 are tightly fitted into the recesses which are formed in the side surfaces of the groove 17 above the portions thereof accommodating the field coils 3.

The superconductive field coils 3 are wound around the line C-C of FIG. 2, and thus a strong magnetic field is established which has a polar axis corresponding to the line C-C.

FIG. 3 shows a perspective view of the coil-carrying shaft 2. The end portions of the field coils 3, namely, the portions thereof running in the circumferential direction of the coil-carrying shaft 2, are also kept in the grooves by a plurality of curved wedges 19A having curved cross-sections corresponding to the cylindrical coil-carrying shaft 2. The grooves under the curved wedges 19A accommodating the end portions of the field coils 3 have the form of portions of an annulus, which is impossible to be machine lathed. The wedges 19A covering the end portions of the field coil 3 and the recesses in the side surfaces of the grooves into which the wedges 19A are fitted are also curved. The fact that the end portions of the wedges 19A, the grooves 17, and recesses receiving the wedges 19A have complicated forms not only results in an increase in the time and cost required in machining, but also decreases the precision thereof, thereby endangering the secureness of the mounting of the superconductive field coils 3 on the coil-carrying shaft 2.

The portions of the rotor not shown in FIGS. 2 and 3 are constructed substantially in the same way as in the rotor of FIG. 1, and thus the descriptions thereof have been omitted from the above explanation.

Referring now to FIGS. 4 and 5 of the drawings, another rotor structure of a superconductive rotary electric machine is described, in which the above described difficulty in the machining of the end portions of the grooves and the wedges is greatly reduced.

FIG. 4 shows a detailed view of an end portions of the coil-carrying shaft 2 and the end portions of the field coils 3. A pair of recesses 17A, one of which is shown in FIG. 4, is formed in the outer surface of the coil-carrying shaft 2, and the bottom surfaces thereof are covered by electrically insulating layers 21. The end portions of the field coils 3 are disposed in the recesses 17A, and the spaces left in the recesses 17A between the field coils 3 are filled by electrically insulating fillers 23. The outer surfaces of the field coil 3 and the fillers 23 are covered by electrically insulating covers 22. FIG. 5 shows a perspective view of one of the two end portions of the coil-carrying shaft 2. The superconductive field coils 3 are accommodated in the recesses 17A formed in the coil-carrying shaft 2, and the electrically insulating fillers 23 are tightly fitted into the spaces left therebetween in the recesses 17A. Further, the coil-end keeper sleeves 16, which are tightly shrink fitted around the coil-carrying shaft 2, keep the end portions of the field coils 3 securely at the correct positions thereof. The grooves 17 and the recesses 17A can be formed in the outer surface of the coil-carrying shaft 2 using a lathe.

The portions of the rotor of FIGS. 4 and 5 not described above are constructed substantially in the same way as the rotor of FIG. 1 or that of FIGS. 2 and 3, and further descriptions thereof are deemed unnecessary.

Conventionally, the field coils 3 have been formed by placing linear wires formed of superconductive material along grooves and recesses in the coil-carrying shaft 3 and bending them at each turn of the windings. The superconductive field coils 3, however, have as many as several thousand turns in each winding thereof, and the superconductor wire cannot be bent so extremely without adverse effects. Thus, the process of mounting field coils 3 on the coil-carrying shaft 2 of FIGS. 4 and 5, for example, has heretofore required much labour and time and precise control of the operations involved.

Referring now to FIGS. 6 and 7 of the drawings, a method of winding and mounting the field coils 3 on the shaft 2 of FIGS. 4 and 5 according to the present invention is described, by which method the labour and time required for the winding and mounting operations of the field-coils is substantially reduced.

FIG. 6 shows an overall view of a bobbin around which the field coils 3 are wound. FIG. 7 shows a cross section of bobbin of FIG. 6 along the line VII—VII of FIG. 6. The bobbin 24 having a planar form is formed of a main portion 24A and a side plate portion 24B which is detachably fixed to the main portion 24A by a plurality of fixing screws 25. The outer cylindrical surface of the bobbin 24 has a plurality of steps as shown in FIG. 7 at the portions thereof corresponding to the portions of a field coil 3 running in the axial direction of the coil-carrying shaft 2. Each step on the outer cylindrical surface of the bobbin 24 has a width B in the radial direction of the bobbin and a height H axially of the bobbin which satisfy the following relationship:

$$B = (2\pi H) \times (Z/360) \times (\tfrac{1}{2}), \text{ namely,}$$

$$B = \pi H Z / 360,$$

wherein Z is the angle measured in degrees between the two axially running portions of the groove 17 formed in the coil-carrying shaft 2 with respect to the axis of the coil-carrying shaft 2. The above-mentioned two axially running portions of the groove 17 correspond to the portions of a field coil 3 formed on those portions of the bobbin 24 having the stepped circumferential surfaces. The circumferential surface of the bobbin 24 has rounded corners at the four intersections of the four straight portions of the circumferential surface of the bobbin 24 corresponding to the axial and circumferential directions of the coil-carrying shaft 2, so that the linear superconductive wire from which the field coils 3 are formed is not bent beyond a tolerable extent when it is wound around the bobbin 24. Namely, the four straight portions of the circumferential surface of the bobbin 24 are connected with each other by circularly curved surface portions.

As shown in FIG. 7, a field coil 3 formed of a linear superconductive wire is wound around the bobbin 24, the portions thereof corresponding to the axially running grooves 17 on the coil-carrying shaft 2 being positioned stepwise in accordance with the stepped circumferential surfaces of the bobbin 24, each stepped portion of the coil 3 constituting a unit winding of the field coil 3. As the bobbin 24 is planar and not curved like the surface of the coil-carrying shaft 2, and is light and small compared thereto, the winding operations of the field coils 3 can be performed much more efficiently.

As a result of winding the superconductive linear material onto the bobbin in this way there is produced a coil formed by a stack of a plurality of turns each in the form of a flat planar substantially rectangular ring having sides symmetrical about a longitudinal turn axis C-C in FIG. 2, and transverse ends with the sides each having the same length and the ends of the turns being superposed directly on top of each other with the longitudinal axes one above the other, and the ends of the successive turns from one end of the stack to the other in the direction of stacking having greater lengths with the sides of the superposed turns being offset laterally outwardly in the plane of the turn relative to the sides of the next adjacent turn in the stack, and the four straight portions of each turn being connected with each other by circularly curved linear material portions.

After the field coil 3 is wound around the bobbin 24 as shown in FIG. 7, the fixing screws 25 are removed and the side plate portion 24B is detached from the main portion 24A of the bobbin 24. Then the field coil 3 is taken off the main portion 24A of the bobbin 24, and is mounted on the coil-carrying shaft 2, the end portions or the circumferentially running portions thereof being bent into circular arcs corresponding to the outer surfaces of the electrically insulating layers 21 disposed on the bottom surfaces of the recesses 17A. The portions of the field coils 3 corresponding to the grooves 17 running in the axial direction of the coil-carrying shaft 2 are fitted into the grooves 17 with the electrically insulating layers 18 being interposed therebetween, as shown in FIG. 2, which shows the cross-section of the coil-carrying shaft 2 having a structure similar to that of the coil-carrying shaft of FIGS. 4 and 5.

After the field coils 3 are disposed on the coil-carrying shaft 2 as shown in FIGS. 2, 4, and 5, the electrically insulator fillers 23 are fitted into the spaces left in the recesses 17A between the field coils 3, and the outer surfaces of the field coils 3 and the fillers 23 are covered by electrically insulating covers 20 and 22. Then, the wedges 19 are fitted into the recesses formed in the grooves 17 over the insulator cover 20 and the pair of sleeves 16 are shrink-fitted around the end portions of the coil-carrying shaft 2. Thus, the field coils 3 are securely mounted on the coil-carrying shaft 2 with less labour and time, and more precision.

What is claimed is:

1. A method of winding a coil of superconductive linear material in a flat planar shape and mounting it on the cylindrical surface of a coil-carrying shaft of a rotor of a superconductive rotary electric machine, said method comprising:

forming at least two parallel grooves in the cylindrical side surface of the coil-carrying shaft with the length of the grooves extending in the axial direction of the coil-carrying shaft and the depth of the grooves extending radially of the coil-carrying shaft;

forming a pair of annular recesses in said surface of the coil-carrying shaft extending in the circumferential direction of the coil-carrying shaft, each of said annular recesses being connected between corresponding ends of said axially extending grooves;

winding a length of superconductive linear material into a coil formed of a stack of a plurality of turns each in the form of a flat planar substantially rectangular ring having sides symmetrical about a longitudinal turn axis and transverse ends with the sides each having the same length and the ends of the turns being superposed directly on top of each other with the longitudinal axes one above the other, and the ends of the successive turns from one end of the stack to the other in the direction of stacking having greater lengths with the sides of the superposed turns being offset laterally outwardly in the plane of the turn relative to the sides of the next adjacent turn in the stack, and the four straight portions of each turn being connected with each other by circularly curved linear material portions; and bending the ends of the turns in said coil such that said ends are slightly curved and conform to said annular recesses and the respective sides of the coil become aligned such that they substantially match said radially extending parallel grooves and disposing them in said recesses and disposing the sides of said turns in said coil in said grooves formed in said surface of the coil-carrying shaft.

2. A method as claimed in claim 1, further comprising, after the removing step and before the disposing step of the coil, the step of covering the surfaces of the grooves and the bottom surface of the recesses with electrically insulating layers, and after the disposing step of the coil, the step of fitting electrically insulating fillers into the spaces left between the coils in said recesses, and the step of covering the outer surfaces of the field coils and the fillers with electrically insulating covers.

3. A method as claimed in claim 2, further comprising, after the step of covering of the outer surfaces of the field coils and the fillers with electrically insulating covers, the step of fitting a pair of sleeves over said recesses formed on said surface of the coil-carrying shaft.

* * * * *